Oct. 10 1967      R. E. SLATTERY      3,345,680
FRICTION TYPE AUTOMOBILE DOOR HOLD-OPEN MEANS
Filed Sept. 21, 1964      2 Sheets-Sheet 1

Inventor
Robert E. Slattery
Andrew F. Wintercorn
Atty.

Oct. 10 1967   R. E. SLATTERY   3,345,680
FRICTION TYPE AUTOMOBILE DOOR HOLD-OPEN MEANS
Filed Sept. 21, 1964   2 Sheets-Sheet 2
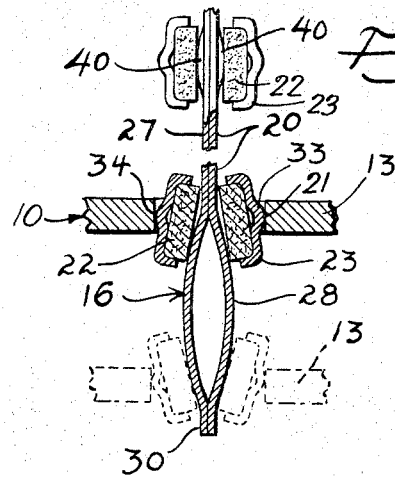
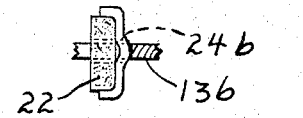
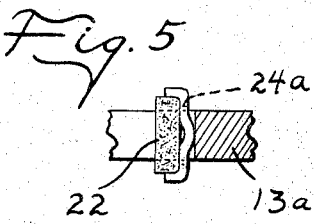
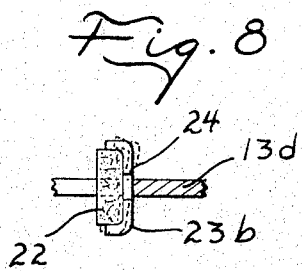
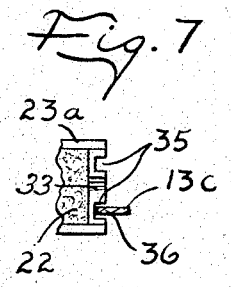
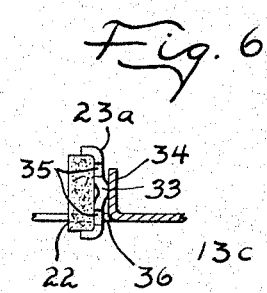
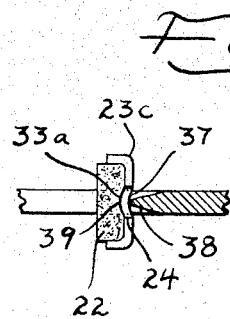
Inventor
Robert E. Slattery
Atty.

United States Patent Office 3,345,680
Patented Oct. 10, 1967

3,345,680
FRICTION TYPE AUTOMOBILE DOOR
HOLD-OPEN MEANS
Robert E. Slattery, Rockford, Ill., assignor to L. W.
Menzimer, trustee, Rockford, Ill.
Filed Sept. 21, 1964, Ser. No. 398,119
Claims priority, application Great Britain, Apr. 21, 1964,
16,401/64
13 Claims. (Cl. 16—140)

This invention relates to friction type automobile door hold-open means, the same being adapted to be separately mounted on the door and pillar but being herein disclosed as applied to or embodied in butt-type hinges for said doors, wherein the strap or arm is pivotally attached at one end to the shank portion of one hinge butt at an appreciable distance from the pintle and is slidable endwise between friction pads carried on backing plates suitably caged and tiltably mounted on opposite sides of a slot provided in the shank portion of the other hinge butt, the free outer end of the strap or arm having stop projections provided thereon arranged for engagement with the last mentioned shank portion at opposite ends of the slot for positively limiting door opening movement. The location of the bowed portions of the strap with respect to the stop projections and the shape of these bowed portions together account for the improved hold-open action obtained with the tiltable friction pads frictionally and compressively engaging the bowed portions of said strap on opposite sides, the tilting of the backing plates carrying the pads giving:

(1) Better hold-open action by virtue of the converging relationship of the pads in the fully opened position of the door;

(2) Improved checking action by virtue of the tangential relationship of the pads to the bowed portion of the strap in all degrees of compression thereof;

(3) Greatly increased width of surface to surface frictional contact between the pads and strap in all positions and therefore reduced unit pressure on the friction material for uniform wear and consequent longer life of the friction pads, and (4) More nearly uniform buildup of frictional resistance from the point of commencement of compression of the bowed portions of the strap to the point of maximum compression, as well as more nearly uniform decrease of such resistance thereafter to the point where the stop projections positively limit further door opening movement.

The invention is illustrated in the accompanying drawings, in which.

Figure 1:
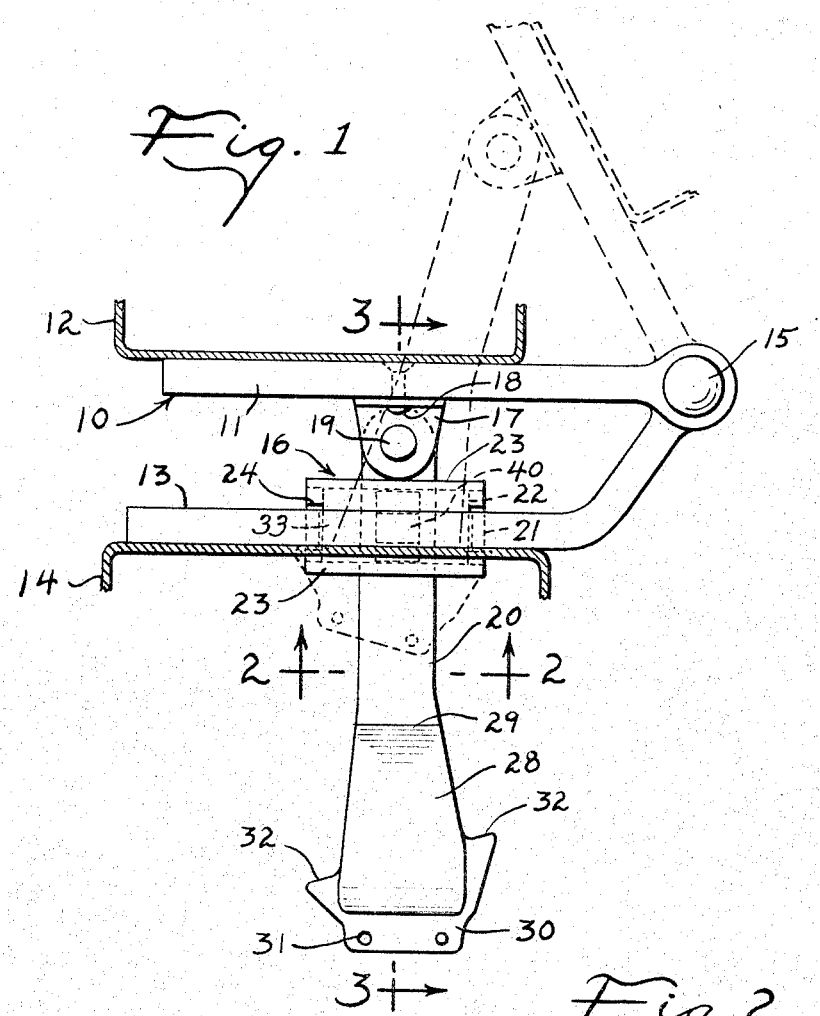
FIG. 1 is a horizontal section through the edge portion of an automobile door and the door pillar showing a butt hinge embodying the improved door checking and hold-open means of my invention.

FIG. 3 is a section on line 3—3 of FIG. 1 but showing the strap in a moved position to show in full lines the diverging relation of the friction pads in one degree of compression of the bowed portion of the strap, when the pads begin to serve as door check means, and in dotted lines their converging relationship at the limit of door opening movement, when the pads serve as hold-open means, an intermediate portion of the length of the strap being broken away to permit showing also at the pivoted end how the pads ride up onto embossed portions of the strap in the closed position of the door to hold them stationary and eliminate rattle;

FIGS. 4 and 5 correspond to a portion of FIG. 3 but showing a thinner hinge butt shank in FIG. 4 and a thicker one in FIG. 5;

FIGS. 6 and 7 are related to FIG. 3 but show still another variation, and

FIGS. 8 and 9 are further variations of FIG. 3.

Similar reference numerals are applied to corresponding parts in these views.

Figure 2:
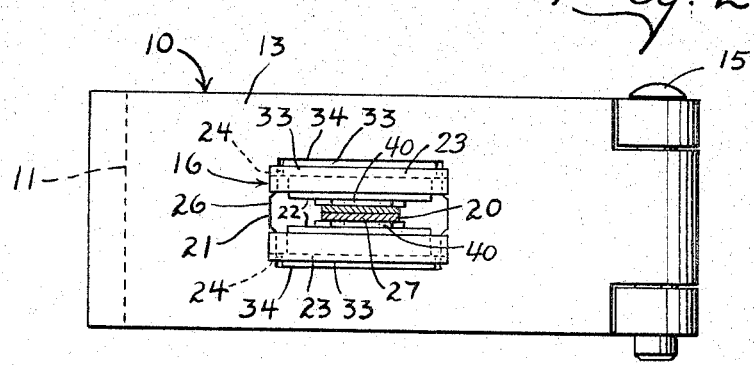
FIG. 2 is a sectional view of the hinge removed from the door and pillar, this view being taken on line 2—2 of FIG. 1.

Referring first to FIGS. 1 to 3, the reference numeral 10 designates a butt type hinge that has the attaching shank portion of one butt 11 suitably secured to the edge portion of an automobile door 12, and the attaching shank portion of the other butt 13 suitably secured to the door pillar 14 on the body, the outer knuckle ends of the two butts being pivotally connected in the usual way by a pintle 15. In accordance with my invention, I provide a friction type check and hold-open means designated generally by the reference numeral 16 on the hinge 10, butt 11 having the two L-shaped halves of a bracket 17 riveted to its shank, as shown at 18, and pivotally connected on a vertical axis, as at 19, to one end of an elongated straight friction strap or arm 20, while butt 13 has a longitudinally extending slot 21 provided in its shank, in which a pair of friction pads 22, each carried on a channel section sheet metal backing plate 23, mounted on the opposite sides thereof and retained against lateral displacement by notched end portions 24 that straddle the opposite ends of the shorter side portions 25 but can be passed easily, one at a time, through the extended middle portion 26 of the slot in assembling the pads on the butt 13 before the inner or pivoted end of the strap 20 is slipped through between the pads and pivotally connected at 19 with brackets 17. Strap 20, as clearly shown in FIGS. 2 and 3, is made up of two strips 27 of half-hard cold rolled steel of suitable thickness in relation to the length of the bowed or ramp portions 28 that are provided on the outer end of the strap. The two pieces 27 except for their bowed portions 28 are flat and in surface to surface engagement from the pivot pin 19 out to line 29 and also at the flat extremities 30 that are spot-welded together as indicated at 31. The bowed portions 28 are substantially wider at their outer ends than at their inner ends and stop projections 32 are provided on opposite sides of the wider outer ends to engage the butt 13 at opposite ends of the slot 21 to limit door opening movement positively, as seen in dotted lines in FIG. 1. In this limit position, the pads 22 which are rockable laterally on longitudinal ribs 33 provided on the longitudinal center line of the backing plates 23, where they engage the parallel top and bottom edges 34 of the slot 21 in the hinge butt 13, are in a slightly converging relationship, as shown in dotted lines in FIG. 3, and are therefore better adapted to serve as hold-open means, the fulcrums defined by these ribs enabling the pads 22 always to lie tangent to the curvature of the bowed portion 28 in whatever position the pads assume along this portion. Thus, on the other end of portion 28, upon commencement of the compression of bowed portion 28, the pads 22 diverge as shown in full lines in FIG. 3. At a mid-point of the length of the bowed portion, where there is maximum compression, the pads 22 are substantially parallel, giving full area surface to surface engagement of the pads on the strap and, therefore, maximum frictional checking action, more nearly uniform wear on the pads, and, consequently, much longer pad life.

It is readily immaterial what the thickness of the hinge butt is, so far as the fulcrum support of the pads 22 on their backing plates 23 is concerned, because these plates are kept centered with respect to the hinge butt by the notches 24 at opposite ends, as previously described, these notches being, of course, wide enough to allow ample rocking action of the pads. Thus, the hinge butt can be as thick as shown in FIG. 3, or thicker, as shown at 13a in FIG. 5, with notches 24a correspondingly widened, or thinner, as shown at 13b in FIG. 4 with correspondingly narrower notches 24b in FIG. 4.

In FIGS. 6 and 7, backing plates 23a are illustrated in conjunction with a rolled or formed hinge butt 13c where there is a right angle outwardly bent lug 34 providing fulcrum support for the pad on each side of the slot in the hinge butt, notches 35 being provided in the backing plate at both ends on opposite sides of the center line of the backing plate to receive end lugs 36 for an interlocking action comparable to what is shown in FIG. 2 in the form first described, the off-center location of the notches 35 on both ends of the backing plate enabling assembling the backing plate on the hinge butt in either of two positions, so long as the longitudinally extending rib 33 serves as the fulcrum support. Here again, the notches 35 are wide enough to allow sufficient freedom of rocking action.

In FIG. 8, the backing plate 23b is flat on the back and there is no projecting rib 33, but the pad is still free to rock sufficiently to serve the purpose described above, due to the fact that the hinge butt 13d is thin enough. On the other hand, instead of having the rib 33 projecting outwardly, I may provide an inwardly projecting rib 33a on the backing plate 23c, as shown in FIG. 9, so as to provide a longitudinally extending groove 37 on the longitudinal center line of the backing plate adapted to receive a V-shaped coined edge 38 on the neighboring side of the slot in the hinge butt 13d, it being a simple matter to mold the pad 22a with a recess 39 lengthwise of the bottom to accommodate the rib 33a. In the other forms, the pad 22 may or may not be molded with a projecting rib to fit inside the rib 33.

In operation, the friction pads 22, which are preferably molded of brake lining material or any other suitable long wearing, quietly operating material are subjected to a slight amount of compression by the forceable entry therebetween of the bowed outer end portion 28 of the strap 20. However, the pads 22 otherwise offer no frictional resistance to door opening or closing movement, the pads being spaced far enough apart, as seen in FIG. 2. It is only when the door nears closed position that the elongated embossed portions 40 projecting from opposite sides of the strap 20 longitudinally of the pivoted end ride between the pads 22 and serve to hold the pads firmly in parallel relationship to one another that they are no longer free and cannot therefore cause any rattle while the car is in motion. Hence, there is no drag imposed on the swinging of the door throughout about half of the range of door opening movement, namely, up to the point where the pads 22 arrive at the line 29. This is important because it is in this range that most door operations occur, the door being opened only far enough to allow a person to enter or leave without too much difficulty, the door being opened this far readily enough in most garages and most parking lots. The restraint on the further door opening movement imposed by the pads 22 sliding on the bowed portion 28 of strap 20 is of advantage in holding the door in whatever position the operator desires and it also reduces the likelihood of banging the door against a wall or an adjacent car. In those instances where a wider opening of the door is necessary or desirable the bulged portion 28 exerts gradually increasing frictional resistance to movement as the pads 22 compress the same as they move farther and farther up the inclined opposite sides of this portion of the strap 20, and it is at this point where the tilting action shown in full lines in FIG. 3 becomes so important, as that insures much wider surface to surface contact between the pads and the strap, thereby giving reduced unit pressure on the pads for uniform wear and consequent longer life of the pads. Maximum resistance to movement is obtained when the pads 22 reach the middle portion of the bowed portion 28 and compress the same to a maximum extent. Then the pads are disposed substantially parallel to one another and have substantially full width engagement with the strap. Substantially all of the last half portion of the door opening movement is therefore under restraint, and when the stop projections 32 strike the hinge butt 13 to limit the door opening movement positively the pads 22 are disposed in the converging relationship indicated in dotted lines in FIG. 3, so that they are nicely adapted for holding the door in the open position. This fully opened limit position of the door is also shown in dotted lines in FIG. 1. Special attention is called to the fact that the strap 20 is made up of two half-hard cold rolled steel strips 27 so that there are two opposed bowed portions 28 to divide the load half to each in contrast to one having to assume all the load. This makes for long life and assurance of both bowed portions retaining their springiness their whole life. These parts 27 require no annealing or heat treating but are used as rolled from the mill. When the door is closed the pads 22 ride up onto the embossed elongated portions 40 and are held firmly enough to prevent rattling while the car is in motion.

It is believed the foregoing description conveys a good understanding of the objects and advantages of my invention. The appended claims have been drawn to cover all legitimate modifications and adaptations.

I claim:

1. Door restraining means for an automobile door mounted in a door frame on hinges to swing on a substantially vertical axis to and from a closed position, the door restraining means comprising a plate fixed to the door and another plate fixed to the door frame, and a substantially horizontally disposed elongated friction strap pivotally connected at its one end on a substantially vertical axis to one of said plates and movable endwise between a pair of friction pads disposed in opposite sides of an opening provided in the other of said plates through which said strap extends, said strap being substantially flat a major portion of the length thereof from the pivoted end and having an enlarged compressible but resilient elongated outer end portion, each pad being substantially wider than said strap to engage the full width thereof and having means whereby it is rockable to an appreciable degree with respect to the supporting plate on an axis parallel to the strap but disposed transversely with respect thereto, whereby the pads are disposed substantially parallel to one another for substantially full frictional engagement on opposite sides of said strap up to the point of engagement with the enlarged compressible end portion, when the pads swing to diverging relationship to one another in riding onto and compressing said end portion.

2. Door restraining means as set forth in claim 1 including a stop projection on said strap at the outer end thereof arranged to engage the last mentioned plate at the limit of door opening movement and they again have substantially full frictional engagement on opposite sides of said strap.

3. Door restraining means as set forth in claim 1 including an enlarged elongated inner end portion giving added thickness to said strip at its pivoted end onto which said pads are arranged to slide when the door nears closed position, whereby to hold said pads stationary and prevent rattling when the automobile is in motion.

4. Door restraining means for an automobile door mounted in a door frame on hinges to swing on a substantially vertical axis to and from a closed position, the door restraining means comprising a plate fixed to the door and another plate fixed to the door frame, and a substantially horizontally disposed elongated friction strap pivotally connected at its one end on a substantially vertical axis to one of said plates and movable endwise between a pair of friction pads disposed in opposite sides of an opening provided in the other of said plates through which said strap extends, said strap being substantially flat a major portion of the length thereof from the pivoted end and having an enlarged compressible but resilient elongated outer end portion formed by oppositely bowed spring portions that are steep at each end and have a slight camber at the middle portion, each pad being substantially wider than the outer end portion of said strap to engage the full width thereof in all positions of the strap with respect thereto and being of non-metallic friction material and mounted in a rigid backing plate, means whereby the latter is rockable to an appreciable degree with respect to the supporting plate on an axis parallel to the strap but disposed transversely with respect thereto, whereby the pads are disposed substantially parallel to one another for substantially full frictional engagement on opposite sides of said strap during their sliding engagement with the strap up to the point of engagement with the enlarged compressible outer end portion, when the pads swing to diverging relationship to one another in riding onto and compressing said end portion when they again have substantially full engagement on opposite sides of said strap, said pads being tangent to the curvature of the oppositely bowed portion in all positions of engagement therewith and being therefore substantially parallel to one another when in engagement with the approximate mid-portion of said bowed portions for maximum friction where the maximum resistance to door movement is obtained.

5. Door restraining means as set forth in claim 4 including an elongated thickened portion at the pivoted end of said strap longitudinally thereof onto which said pads are arranged to slide when the door nears closed position, whereby to hold said pads stationary and prevent rattling when the automobile is in motion.

6. Door restraining means as set forth in claim 4 including a stop projection on said strap at the outer end thereof arranged to engage the last mentioned plate at the limit of door opening movement, the stop projection being so arranged with relation to the bowed portions that the pads are disposed in outwardly converging relationship to one another with respect to the outer end of said strap for increased hold-open action.

7. Door restraining means for an automobile door mounted in a door frame on hinges to swing on a substantially vertical axis to and from a closed position, the door restraining means comprising a plate fixed to the door and another plate fixed to the door frame, and a substantially horizontally disposed elongated friction strap pivotally connected at its one end on a substantially vertical axis to one of said plates and movable endwise between a pair of friction pads disposed in opposite sides of an opening provided in the other of said plates through which said strap extends, said strap being made up of two abutting flat strips of low carbon steel as rolled from the mill, each strip having an outwardly projecting elongated compressible resilient outer end portion, these end portions together defining an enlarged compressible but resilient elongated end portion on said strap, each pad being substantially wider than the said resilient end portion of said strap to engage thereon the full width thereof in all positions of the strap with respect thereto and being of non-metallic friction material and mounted in a rigid backing plate, means whereby the latter is rockable to an appreciable degree with respect to the supporting plate on an axis parallel to the strap but disposed transversely with respect thereto, whereby the pads are disposed substantially parallel to one another for substantially full frictional engagement on opposite sides of said strap during their sliding engagement with the strap up to the point of engagement with the enlarged compressible end portion, when the pads swing to diverging relationship to one another in riding onto and compressing said end portion and they again have substantially full frictional engagement on opposite sides of said strap.

8. Door restraining means for an automobile door mounted in a door frame on hinges to swing on a substantially vertical axis to and from a closed position, the door restraining means comprising a plate fixed to the door and another plate fixed to the door frame, and a substantially horizontally disposed elongated friction strap pivotally connected at its one end on a substantially vertical axis to one of said plates and movable endwise between a pair of friction pads disposed in opposite sides of an opening provided in the other of said plates through which said strap extends, said strap being made up of two abutting flat strips of low carbon steel as rolled from the mill, each strip having an elongated outwardly bowed spring portion on the one end thereof, these end portions together defining an enlarged compressible but resilient oppositely bowed elongated outer end portion, the oppositely bowed portions of which are relatively steep at each end but have a slight camber at the middle, each pad being substantially wider than the last named end portion of said strap to engage the full width thereof in all positions of the strap with respect thereto and being of non-metallic friction material and mounted in a rigid backing plate, means whereby the latter is rockable with respect to the supporting plate on an axis parallel to the strap but disposed transversely with respect thereto, whereby the pads are disposed substantially parallel to one another for substantially full frictional engagement on opposite sides of said strap up to the point of engagement with the enlarged compressible end portion, when the pads swing to diverging relationship to one another in riding onto and compressing said end portion and they again have substantially full frictional engagement on opposite sides of said strap, said pads being tangent to the curvature of the oppositely bowed portion in all positions of engagement therewith and being therefore substantially parallel to one another when in engagement with the intermediate portion of said bowed portions where the maximum resistance to door movement is obtained and being disposed in converging relationship to one another when they bear on the outer end of said bowed portions, there being a stop projection on said strap at the outer end thereof arranged to engage the last mentioned plate at the limit of door opening movement with the pads disposed in outwardly converging relationship to one another with respect to the outer end of said strap for increased hold-open action.

9. Door restraining means as set forth in claim 1, wherein the opening provided in the second named plate is substantially rectangular and said friction pads are also substantially rectangular, said opening being elongated at the middle enough to permit passing the full length of each pad therethrough, and both pads having portions at both ends cut away to admit the thickness of said second plate with sufficient clearance to permit appreciable tilting of said pads relative to said second plate, these cut-away portions on the ends of each pad also defining retaining projections on said ends which by abutment with said second plate prevent lateral displacement of said pads from assembled position in said opening.

10. Door restraining means as set forth in claim 4, wherein the opening provided in the second named plate is substantially rectangular and said friction pads and backing plates are also substantially rectangular, said opening being elongated at the middle enough to permit passing the full length of each pad and its backing plate therethrough, and both pads and their backing plates having portions at both ends cut away to admit the thickness of said second plate with sufficient clearance to permit appreciable tilting of said pads and backing plates relative to said second plate, these cutaway portions on the ends of each pad and backing plate also defining retaining projections on said ends which by abutment with said second plate prevent lateral displacement of said pads and backing plates from assembled position in said opening.

11. Door restraining means as set forth in claim 10 wherein said backing plates have fulcrum ribs extending lengthwise thereof on their center line for rocker abutment with said second plate lengthwise of opposite sides of the opening therein.

12. Door restraining means as set forth in claim 10 wherein said backing plates have fulcrum ribs extending lengthwise thereof on their center line for rocker abutment with said second plate lengthwise of opposite sides of the opening therein, said ribs defining grooves therein in which generally V-shaped fulcrum portions defined on said second plate are pivotally engaged.

13. Door restraining means as set forth in claim 10 wherein said second plate has right angle flanges projecting therefrom in the same direction in parallel relation to one another on opposite sides of said opening to define fulcrum supports for said pads and backing plates, said backing plates having fulcrum ribs extending lengthwise thereof on their center line for rocker abutment with said flanges.

References Cited

UNITED STATES PATENTS 3,244,034   9/1965   Fannan et al. _____ 16—82

MARVIN A. CHAMPION, *Primary Examiner.*

D. L. TROUTMAN, *Assistant Examiner.*